United States Patent [19]

Zukausky

[11] Patent Number: 4,500,067
[45] Date of Patent: Feb. 19, 1985

[54] PILOT OPERATED LOW FLOW VALVE

[75] Inventor: Keith E. Zukausky, Hanover, Ill.

[73] Assignee: Eaton Corporation, Cleveland, Ohio

[21] Appl. No.: 464,307

[22] Filed: Feb. 7, 1983

[51] Int. Cl.³ ............................................. F16K 31/126
[52] U.S. Cl. ...................................... 251/38; 137/242; 251/30; 251/45
[58] Field of Search ...................... 251/11, 30, 38, 39, 251/45; 137/242, 606

[56] References Cited

U.S. PATENT DOCUMENTS

| | | | |
|---|---|---|---|
| 1,013,213 | 1/1912 | Noyes | 251/38 |
| 1,118,440 | 11/1914 | Perkins | 251/38 |
| 1,157,870 | 10/1915 | Houser | 251/38 |
| 1,233,937 | 7/1917 | Twigg et al. | 251/38 |
| 1,248,777 | 12/1917 | Ahlheim | 251/38 |
| 1,911,748 | 5/1933 | Carlstedt | 251/38 |
| 1,985,257 | 12/1934 | Kocour | 251/40 |
| 3,114,532 | 12/1963 | Gray | 251/38 |
| 3,593,957 | 7/1971 | Dolter | 251/38 |
| 3,784,154 | 1/1974 | Ostrowski | 251/30 |
| 3,791,578 | 2/1974 | Brand | 251/38 |
| 3,872,878 | 3/1975 | Kozel | 251/45 |
| 3,989,222 | 11/1976 | Yoshiyasu | 251/38 |
| 4,078,574 | 3/1978 | Kosarzecki | 251/366 |
| 4,174,824 | 11/1979 | Kolze | 251/45 |
| 4,222,410 | 9/1980 | Geimer | 251/30 |
| 4,283,040 | 8/1981 | Kolze | 251/45 |
| 4,387,878 | 6/1983 | Zukausky | 251/30 |

Primary Examiner—Samuel Scott
Assistant Examiner—Allen J. Flanigan
Attorney, Agent, or Firm—C. H. Grace; R. A. Johnston

[57] ABSTRACT

Upon energization a solenoid (58) activates a pilot valve means (44,46) for opening a pilot flow passage (34) causing flow from a pilot portion (52) of the valving chamber. Flow from the main valving chamber (18) and through a bleeder passage (50) is insufficient to prevent a loss of pressure in the chamber (52) and the pressure in valving chamber (18) urges diaphragm pad (29) upward away from contact with valve seat (26) to permit flow from chamber (16) to outlet (20). A diaphragm insert (30) has a portion (32) with a lip (68) extending into a narrow section (66) of outlet (32) for providing a downstream restriction to maintain sufficient pilot circuit differential to provide valve movement until rim (68) moves out of passage (66) thus providing any desired stroke by adjusting the level of (66) to prevent trapping fine particles of foreign matter at the valve seat.

4 Claims, 4 Drawing Figures

PILOT OPERATED LOW FLOW VALVE

BACKGROUND OF THE INVENTION

The present invention relates to inlet valves for appliances and in particular to water inlet valves for domestic appliances such as, for example, ice makers and humidifiers. Appliances of this type commonly employ an electrically actuated water inlet valve for supplying water to a receptacle in response to energization from a programmer timer. The electrical actuation is usually accomplished by energizing a solenoid having a armature operable to effect movement of the valving member.

Where solenoid actuated water inlet valves are employed for appliances, two types of such valves have been found useful: namely, a pilot operated valve and a directly actuated valve.

In instances where relatively low flow rates are required for a particular appliance application there is insufficient pressure differential across the diaphragm of a pilot operated valve to stroke the main valve open sufficiently to prevent trapping of foreign particles on the valve seat.

The amount of main valve member or poppet, stroke of such a valve at very low flow rates may be only a small fraction of a millimeter and consequently the flow velocity is high across the main valve seat. The higher flow velocities encountered with such a small stroke or opening of the main valve member tend to move all foreign particles entering the valving chamber to the valve seat where they are trapped by the aforesaid small opening formed by the poppet lift from the valve seat.

In field service, the trapping of particles at the valve seat has been found to cause an accumulation of particles and a resultant build-up or deposits of foreign material on the valve seat. These deposits have prevented sealing of the valve upon closing and this has caused the valve to fail by not being able to shut off flow.

It has therefore been found necessary, for such low flow rate applications, to employ a directly actuated solenoid valve to effect proper opening of main valving member.

In low flow rate applications where a directly actuated solenoid valve has been employed, it has been found that the magnetomotive force required to effect direct movement of the valving member by the solenoid armature becomes substantially greater than that required for a pilot operated valve. In order to provide the increased magnetomotive force additional ampere-turns are required in the coil, which increases the amount of copper in the coil and thus results in increased manufacturing costs.

In those applications where higher flow rates are required for the particular appliance, the high velocity exit flow reduces the static pressure and this creates sufficient pressure forces on the main valving member to enable a pilot operated valve to be employed. The magnetomotive force required for armature actuation of a pilot operated valve is quite low, and thus a smaller less costly coil may be employed in the solenoid.

Thus, it has long been desired to find a way or means of employing a low cost pilot operated pressure differential actuated solenoid inlet valve for low flow rate applications in appliances. In particular it has been desired to provide a solenoid type pilot operated water inlet valve for low flow rate applications where the main valving member strokes sufficiently to prevent trapping and build-up of foreign particles on the valve seat.

SUMMARY OF THE INVENTION

The present invention solves the above described problem by providing a novel low cost solenoid operated water inlet valve for use in domestic washing appliances. The valve of the present invention is capable of handling a broad range of high and low flow rates and employs a pilot operated valving action which requires a relatively low magnetomotive force upon energization of the solenoid to effect valve opening.

The novel valve of the present invention employs an electrically energized solenoid having the pilot valve operator formed as part of the movable armature thereby requiring a low magnetomotive force output from the solenoid.

The main valving member comprises a flexible diaphragm having an insert with a pilot seat and pilot passage extending therethrough for enabling pilot flow from a chamber on one side of the diaphragm upon movement of the armature/pilot operator when the solenoid is energized. Flow through the pilot passage to the valve outlet causes a loss of pressure on one side of the diaphragm which enables supply line pressure acting on the opposite side of the diaphragm to open the main valve member.

A flow restriction is provided in the valve outlet passage to create sufficient backpressure in the outlet passage adjacent the diaphragm to maintain a suitable pressure differential across the diaphragm to stroke the main valve sufficiently in the open position to prevent trapping of small foreign particles on the valve seat.

The outlet flow restriction is provided in the form of an annular orifice between a downstream extended portion of the diaphragm insert and the wall of the valve outlet passage.

The present invention thus employs a low force requirement pilot operated pressure differential actuated water inlet valve for a washing appliance which maintains suitable valve stroke to enable passage of small foreign particles.

DETAILED DESCRIPTION

Figure 1:
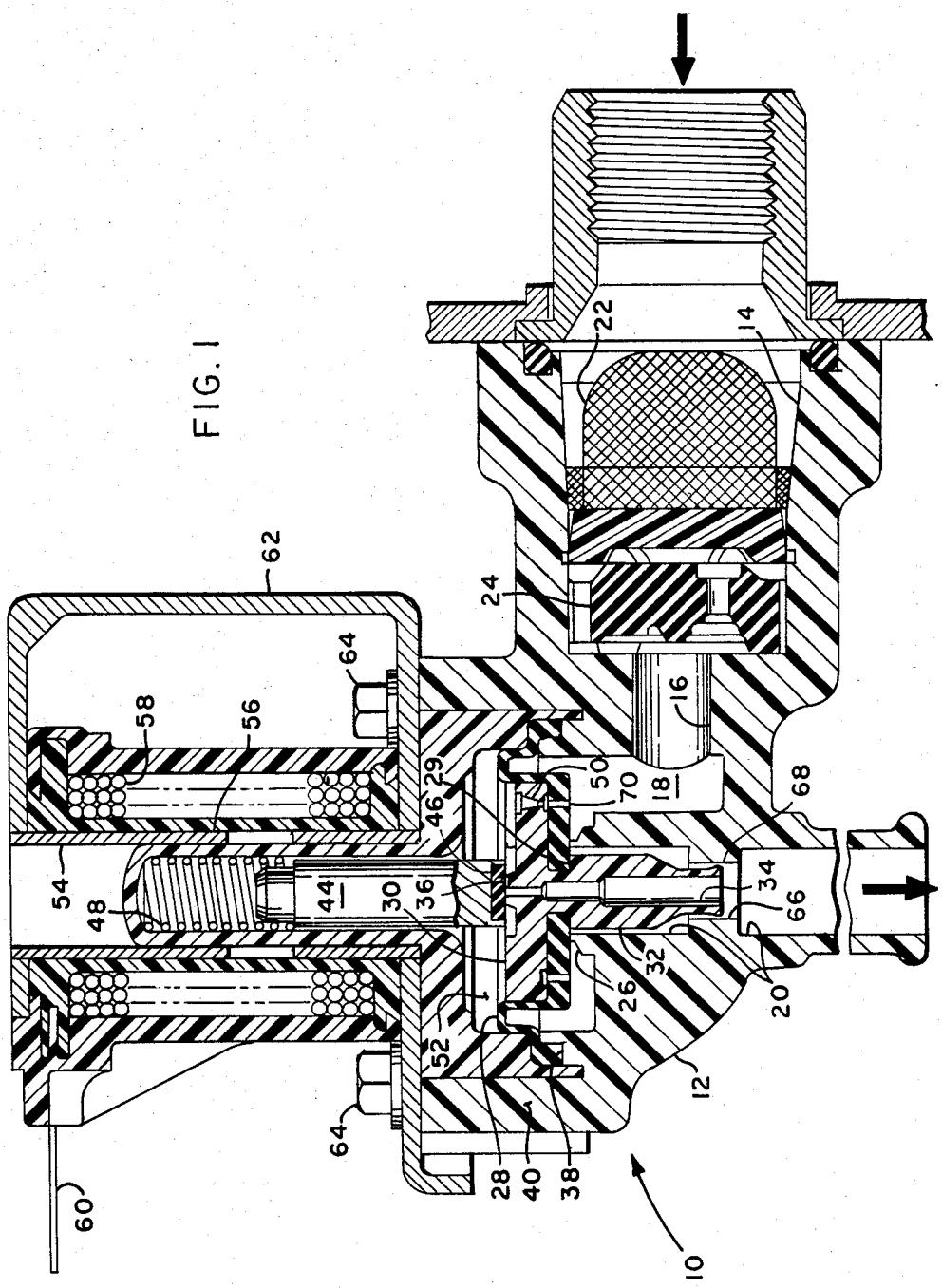
FIG. 1 is a cross sectional view of the preferred form of the valve of the present invention.

Referring now to FIG. 1 the valve of the present invention is indicated generally at 10. The valve 10 is an improvement for the pilot operated pressure differential actuated valves known in the art, as for example, that shown and described in U.S. Pat. No. 3,593,957.

The valve 10 of FIG. 1 employs a valve body 12 having an inlet 14 formed therein communicating via passage 16 with valving chamber 18. The valve body has an outlet passage 20 also communicating with chamber 18 as will be hereinafter described.

The inlet 14 has received therein a suitable filter screen 22 and a resilient flow control washer 24 of the type well known in the art, as for example, that described in U.S. Pat. No. 3,006,378 issued to H. L. Erickson.

The valving chamber 18 has an annular valve seating surface 26 provided at the intersection of the outlet passage 20 with the valving chamber 18. The valving chamber 18 is divided into an upper and lower section by resilient diaphragm 28 which has a thickened central valve portion 29, which has a rigid insert 30.

Insert 30 has an elongated preferably centrally disposed portion 32 extending through an aperture in the center of the diaphragm and downwardly therefrom into the outlet passage 20. Insert portion 32 has a pilot flow passage 34 provided centrally therethrough. A pilot valve seat 36 is provided at the intersection of passage 34 with the upper surface of insert 30.

The outer periphery of diaphragm 28 is received in the body 12 in an annular groove 38 formed therein and retained in the groove by the outer rim of a cylindrical hollow armature guide member 40 in fluid pressure sealing engagement.

The guide member 40 has an upper portion 42 of reduced diameter which has slidably received therein an armature 44. A resilient pilot valve pad 46 is received on the lower end of armature 44 for contacting pilot seat 36. A compression spring 48 is received in the upper portion 42 of the guide and urges the armature in a downward direction to cause the pilot valve pad to contact the pilot seat 36.

A pressure equalizing bleed passage 50 is provided through the diaphragm central portion 29 and through the insert 30 for permitting limited continuous communication of the lower portion of chamber 18 with the upper portion comprising the hollow region 52 of the armature guide disposed above the diaphragm.

The armature guide has received thereover axially spaced upper and lower pole piece tubes 54, 56 formed of ferromagnetic material.

An encapsulated electrical coil 58 is received over the pole piece tubes and has the ends of the electrical conductor connected respectively to a pair of electrical terminals one of which is illustrated at 60 in FIG. 1.

A suitable ferromagnetic pole frame 62 is provided having a generally "C" shaped configuration. One side of pole frame 62 is apertured and has the lower end of lower pole tube 56 received therein; and, the opposite side is apertured with the upper end of upper pole piece tube 54 received therein. The lower side of the pole frame 62 is attached to the body 12 by any suitable expedient as for example self tapping screws 64.

In operations when the coil 58 is energized, the magnetomotive force thus generated causes armatures 44 to overcome the bias of spring 48 and move upward tending to seek an equilibrium position with respect to the air gap between pole pieces 54, 56 thereby moving pilot valve pad 46 upwardly away from the closed position against pilot seal 36 as shown in FIG. 1.

Opening of the pilot valve 46 permits water in portion 52 of the valving chamber to flow through pilot passage 34 to the outlet 20 at a greater rate than water can flow into chamber 52 through bleed passage 50. This causes a loss of pressure in chamber 52, which creates a pressure differential across diaphragm 28. The resulting forces lift diaphragm portion 29 upwardly to permit flow from the valving chamber 18, over main valve seat 26 to outlet 20.

The lower portion 32 of the diaphragm insert has the lower end thereof received in a reduced diameter section 66 of the outlet passage. In the embodiment of FIG. 1, the end of the extended portion 32 has a lip or rim formed annularly thereabout with the outer periphery of the rim 68 sized to closely interfit the reduced diameter portion 66 in sliding engagement. The annular orifice formed between the wall of passage 66 and lip 68 comprises a reduced flow area and serves to create a pressure drop in the flow outlet which in turn maintains a sufficient pressure in the chamber 18 to keep the lower surface 70 of the central portion of the diaphragm spaced from valve seat 26. If desired passage 66 may be extended upward to enable the valve to stroke to any desired height provided there is sufficient clearance and convolution length in the diaphragm to accommodate such increased stroke.

In the presently preferred practice for a valve designed to operate at residential line service pressures of 15–125 pounds per square inch and flow rates in the range of 0.5 to 2.8 liters per minute, the rim 68 on insert 32 is chosen so as to create a flow area on the order of 2.6 mm$^2$. A valve having these characteristics has been found to function satisfactorily with a minimum flow area in pilot passage 34 of 0.4 mm$^2$.

Figure 4:
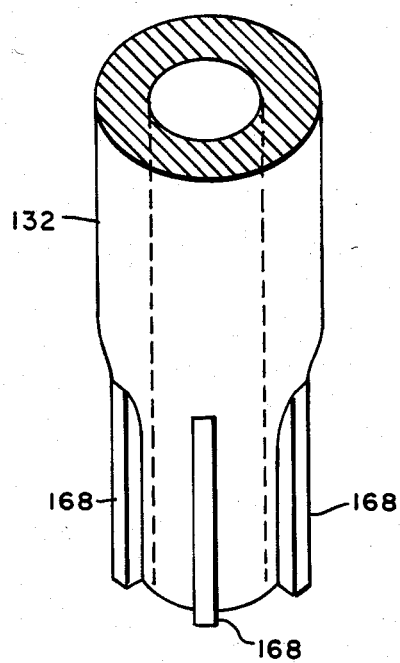
FIG. 4 is an enlarged perspective view of an alternate embodiment of the flow restrictor.

Referring now to FIG. 4 an alternate embodiment of the diaphragm insert is illustrated wherein the lower elongated portion is indicated at numeral 132. In the embodiment of FIG. 4, the insert portion 132 has, in place of the rim or lip 68 of the FIG. 1 embodiment, a plurality of circumferentially spaced longitudinally extending flutes or ribs 134.

Figure 2:
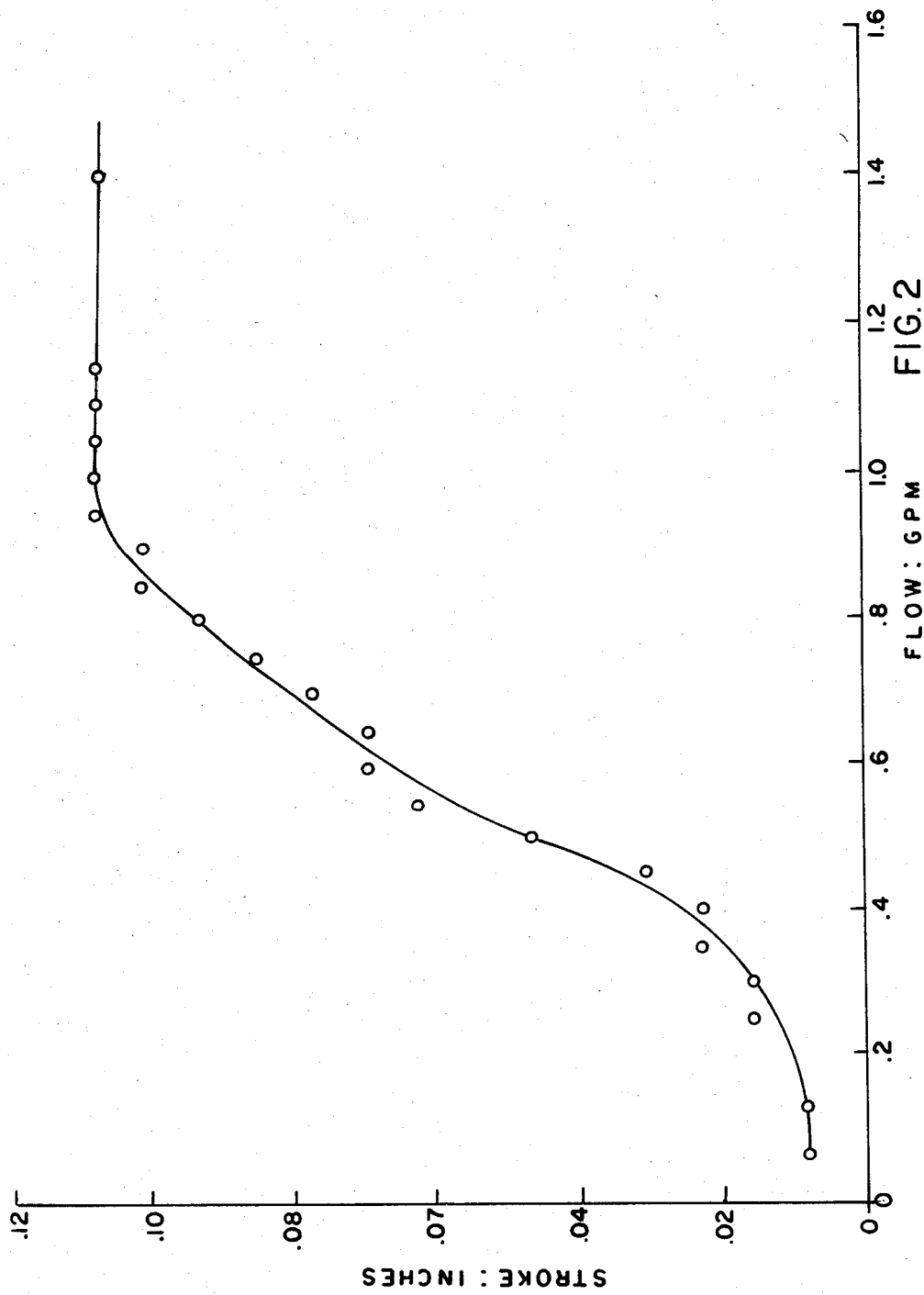
FIG. 2 is a graphical plot of main valve stroke as the ordinate plotted as a function of flow rate plotted as the abscissa.
Figure 3:
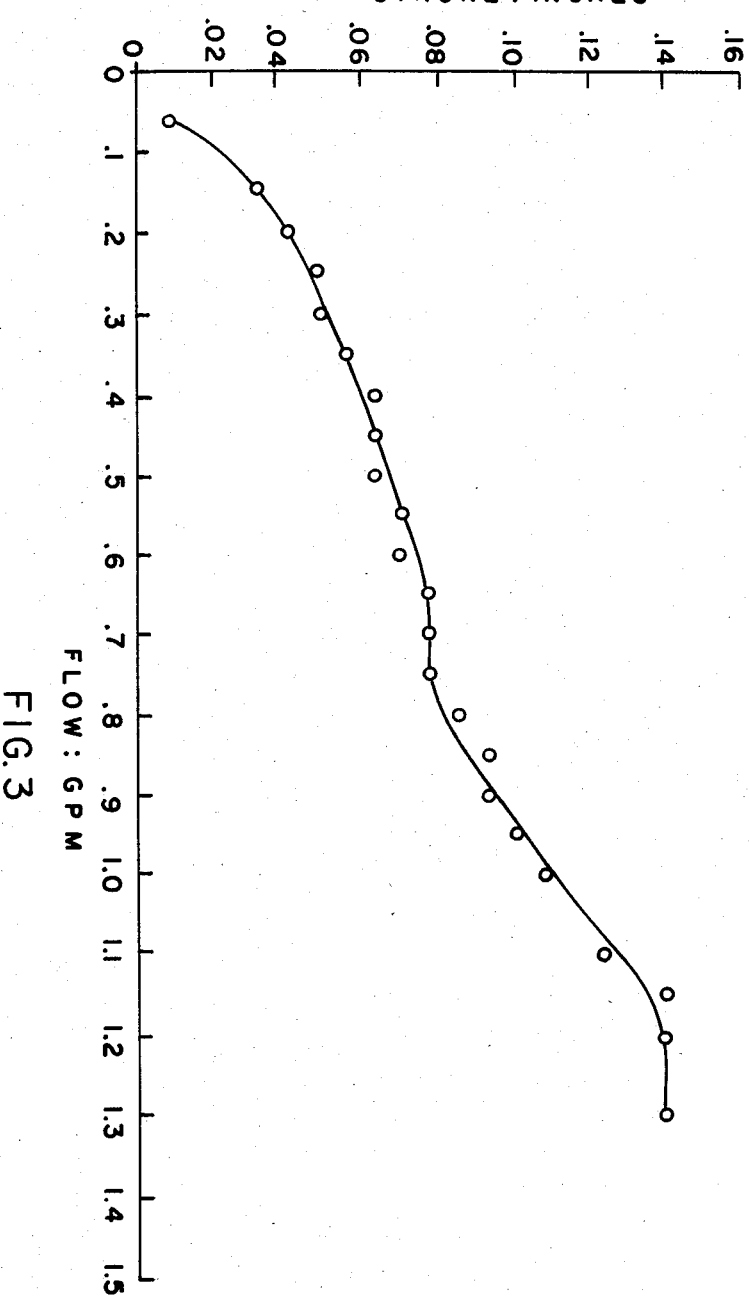
FIG. 3 is a graphical plot similar to FIG. 2 and shows the stroke versus flow rate for the valve of the present invention.

Referring now to FIGS. 2 and 3 it will be seen that, for flow rate in the range 0–0.4 gallons per minute (GPM), the upward lift, or stroke, of the diaphragm seating surface 70, plotted as the ordinate, is substantially greater in the graph of FIG. 3, which illustrates the performance of the present invention, as compared to the operation of the prior art as illustrated in the graph of FIG. 2.

The present invention thus provides a pilot operated, water inlet valve for appliances which employs an integral flow restriction disposed between the pilot supply and the pilot discharge for increasing pilot differential across the diaphragm. The present valve provides the flow restriction by employing configured surfaces on the portions of the diaphragm insert extending through the diaphragm into the outlet passage to cooperate with the outlet to form an annular flow orifice of reduced flow area. The downstream flow restriction creates adequate back-pressure in the valving chamber lower section 18 at low flow rates while simultaneously lowering pressure in the pilot exit passage 34 thus boosting the differential across diaphragm 28 causing the main poppet to lift until rim 68 moves clear of passage wall 66 thus causing adequate diaphragm lift or stroke to prevent trapping of small foreign particles at the valve seat and thus prevent deposit build-up on the valve seat.

What is claimed is:

1. A pilot operated pressure actuated valve comprising;
    (a) body means defining a valve inlet port and a valve outlet port and a valving cavity communicating with said inlet and outlet ports and having a valving surface disposed in the flow path therebetween;
    (b) pressure responsive main valve means operable to divide said cavity into a first valving chamber and a second chamber communicating with said inlet and said outlet and operative to move between a position contacting and a position spaced from said valving surface for alternately preventing and permitting flow from said inlet to said outlet, said main valve means including a pilot flow passage therethrough communicating said first chamber with said outlet and including a pilot valve seat;

(c) means defining a bleed passage providing limited continuous communication between first chamber with said second chamber;

(d) pilot valve means operable upon actuation and deactuation to move between a position contacting and a position spaced from said pilot valve seat for alternately permitting and preventing flow from said first chamber to said outlet passage; and (e) guide means including an extended portion movable with said main valve means to direct movement thereof, said extended portion including flow restriction means comprising a raised surface disposed circumferentially thereabout and cooperating with said outlet port to create a desired pressure drop thereacross upon opening of said main valve means, wherein said bleed passage permits pressure equilibrium in said first and second chambers when said main and pilot valve means are each in their respective flow preventing positions and, upon said pilot valve means opening fluid flows from said first chamber through said pilot passage to said outlet causing a pressure differential across said main valve means thereby causing said main valve means to open.

2. The valve defined in claim 1 wherein said pressure responsive member comprises a flexible diaphragm.

3. The valve defined in claim 1 wherein,
(a) said pressure responsive means comprises a flexible diaphragm disposed in said cavity and sealed about the periphery thereof to divide said cavity into said first and second chambers; and
(b) said guide means includes an insert received through said diaphragm, said insert having said pilot flow passage formed therethrough and having said raised surface comprising an annular rib disposed adjacent the downstream end of said extend portion.

4. A pilot operated pressure actuated valve comprising;
(a) body means defining a valve inlet port and a valve outlet port and a valving cavity communicating with said inlet and outlet ports and having a valving surface disposed in the flow path therebetween;
(b) pressure responsive main valve means operable to divide said cavity into a first valving chamber and a second chamber communicating with said inlet and said outlet and operative to move between a position contacting and a position spaced from said valving surface for alternately preventing and permitting flow from said inlet to said outlet, said main valve means including a pilot flow passage therethrough communicating said first chamber with said outlet and including a pilot valve seat;
(c) means defining a bleed passage providing limited continuous communication between first chamber with said second chamber;
(d) pilot valve means operable upon actuation and deactuation to move between a position contacting and a position spaced from said pilot valve seat for alternately permitting and preventing flow from said first chamber to said outlet passage; and
(e) guide means including an extended portion movable with said main valve means to direct movement thereof, said extended portion including flow restriction means comprising a raised surface disposed circumferentially thereabout and cooperating with said outlet port to create a desired pressure drop thereacross upon opening of said main valve means, said flow restricting means comprising a peripherally extending rib disposed about said extended portion adjacent the downstream end thereof.

* * * * *